E. E. BRODECKY.
AUTOMOBILE SPRING.
APPLICATION FILED MAY 21, 1913.
1,174,118.
Patented Mar. 7, 1916.
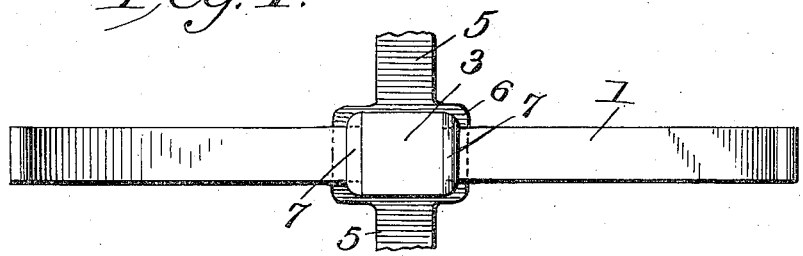
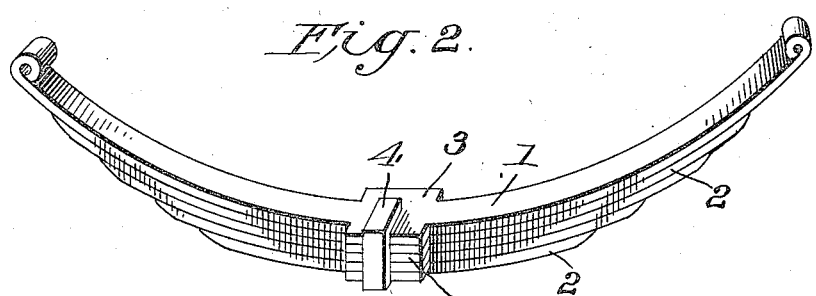
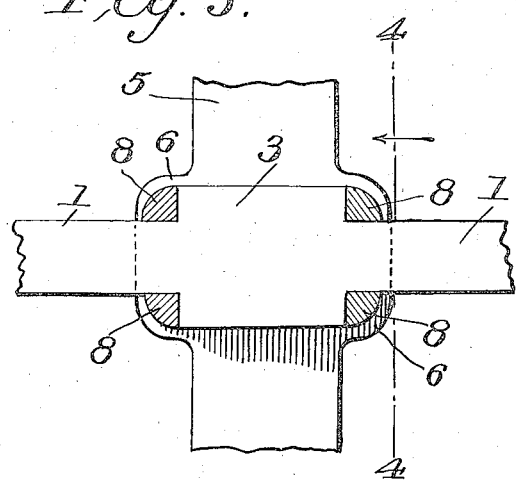
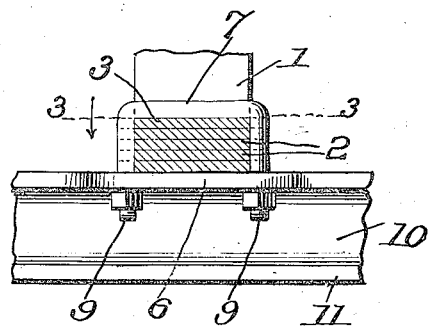
Witnesses
Jos. A. Ryan
May Barnes
Inventor
Emil E. Brodecky
By George W. Sues.
Attorney

UNITED STATES PATENT OFFICE.

EMIL E. BRODECKY, OF HOWELLS, NEBRASKA.

AUTOMOBILE-SPRING.

1,174,118.  Specification of Letters Patent.  Patented Mar. 7, 1916.

Application filed May 21, 1913. Serial No. 769,019.

*To all whom it may concern:*

Be it known that I, EMIL E. BRODECKY, a citizen of the United States, and a resident of Howells, in the county of Colfax and State of Nebraska, have invented certain new and useful Improvements in Automobile-Springs, of which the following is a specification, reference being had to the accompanying drawings.

This invention relates to automobile or other vehicle springs and one of the principal objects of the same is to provide means of simple construction to prevent the breaking of the springs in the center.

It has been demonstrated beyond question that automobile springs usually break in the center, owing to the fact that there are bolt holes or a bolt hole in the center and that the spring leaves are of substantially the same width from end to end.

The principal object of my invention is to overcome this particular defect in springs by reinforcing them in the center and at the same time to omit the bolt holes which usually cause the springs to break at this point.

These and other objects may be attained by means of the construction illustrated in the accompanying drawing, in which:

Figure 1 is a top plan view of an automobile spring made in accordance with my invention, said view showing a portion of the axle broken away at its ends; Fig. 2 is a persepctive view showing the spring before it is secured in place on the automobile; Fig. 3 is a transverse sectional view taken on the line 3—3 of Fig. 4 looking in the direction indicated by the arrow; and Fig. 4 is a vertical sectional view taken on the line 4—4 of Fig. 3 looking in the direction indicated by the arrow.

Referring to the drawing, the numeral 1 designates the top leaf of the elliptical spring and the other leaves which are graduated in length are indicated by the numeral 2, the general arrangement of leaves being substantially like elliptical springs in present use. At the center of each leaf of the spring is a rectangular enlargement 3 formed in all the leaves of the spring and when the spring is assembled as shown in Fig. 2 before it is attached to the axle an ordinary metal clip 4 is used for holding the leaves together for shipment or storage.

The axle 5 is provided with an enlargement 6 in the form of two outwardly positioned laterally extending flanges, each having suitable bolt openings; the flanges being located at the point of attachment of the spring and the enlarged portion 3 of the springs rests upon this enlargement 6 of the axle. For securing the springs to the axle without the use of bolts passing through the springs, clevises or clips 7 are utilized, said clevises each having downwardly projecting legs 8 and said legs being angular on two sides and preferably rounded on the outer side so that when the threaded and rounded ends 9 are passed through the holes or openings made for their reception in the extending flanges 6 of the axle, all the springs are held firmly in place without the use of bolts extending through the center of the leaves of the spring. As shown the axle enlargement is of a greater area than the rectangular enlargement of the springs so that the axle enlargement projects beyond the spring enlargements. The axle as shown is somewhat of T-shape in cross section having a web 10 and a base flange 11 somewhat smaller than the upper flange 5.

From the foregoing, it will be obvious that a spring made in accordance with this invention having an enlargement at the center which is not perforated to weaken the same and which is held in place on the axle by a pair of clevises having angular inner sides is much stronger than the ordinary spring, can be connected to any axle by means of suitable clips connected to the rounded ends 9 of the clevises and that when so connected the springs are not liable to break in the center, while the cost of construction is no greater than that of the ordinary vehicle spring of the same general size and weight.

I claim:

In combination, an automobile spring comprising a top leaf and other leaves a rectangular enlargement being formed at the center of all of said leaves, of an axle provided with an enlargement at the point of attachment of the spring of a greater area than said rectangular enlargement having openings, the enlarged portions of said springs resting upon said axle enlargement, clips each having downwardly projecting legs with threaded ends, said legs being angular on two sides and rounded on the other whereby when the threaded ends of the legs are passed through the holes in said axle enlargement said angular sides are held against said rectangular enlargements holding all the springs firmly in place, and nuts engaging the threaded ends, as and in the manner shown.

In testimony whereof I affix my signature, in the presence of two witnesses.

EMIL E. BRODECKY.

Witnesses:
 E. QUESNER,
 A. M. COUFAL.